United States Patent

Kobayashi et al.

[11] Patent Number: 5,580,508
[45] Date of Patent: Dec. 3, 1996

[54] PROCESS FOR PREPARING CALCIUM SILICATE ARTICLES

[75] Inventors: Waichi Kobayashi; Satoshi Otaka; Hideo Uchiyama; Toshihiro Nakata; Tetsuya Sadatani, all of Ube, Japan

[73] Assignee: Ube Industries, Ltd., Yamaguchi, Japan

[21] Appl. No.: 395,159

[22] Filed: Feb. 27, 1995

Related U.S. Application Data

[63] Continuation of Ser. No. 217,630, Mar. 24, 1994, abandoned, which is a continuation of Ser. No. 899,047, Jun. 16, 1992, abandoned, which is a continuation of Ser. No. 771,796, Oct. 4, 1991, abandoned, which is a continuation of Ser. No. 530,426, May 29, 1990, abandoned, which is a continuation of Ser. No. 253,057, Oct. 4, 1988, abandoned, which is a continuation-in-part of Ser. No. 145,647, Jan. 13, 1988, abandoned, which is a continuation of Ser. No. 35,077, Apr. 6, 1987, abandoned.

[30] Foreign Application Priority Data

Apr. 4, 1986 [JP] Japan ................................. 61-76701
Nov. 7, 1986 [JP] Japan ................................. 61-263651

[51] Int. Cl.$^6$ .................................................. B29C 71/00
[52] U.S. Cl. ........................... 264/234; 264/294; 264/345
[58] Field of Search .................................. 264/234, 333, 264/345, 294

[56] References Cited

U.S. PATENT DOCUMENTS

| | | | |
|---|---|---|---|
| 3,901,991 | 8/1975 | Ueda et al. | 428/446 |
| 3,957,522 | 5/1976 | Matsuo et al. | 106/109 |
| 4,146,402 | 3/1979 | Kira et al. | 106/109 |
| 4,287,103 | 9/1981 | Francis et al. | 260/17 R |
| 4,377,977 | 3/1983 | Wurster | 109/83 |
| 4,476,187 | 10/1984 | Chang | 428/325 |
| 4,481,177 | 11/1984 | Valyocsik | 423/329 |
| 4,488,909 | 12/1984 | Galer et al. | 106/89 |
| 4,622,071 | 11/1986 | Matsuura et al. | 106/97 |
| 4,673,543 | 6/1987 | Akasaka et al. | 264/82 |
| 4,799,961 | 1/1989 | Friberg | 106/93 |

FOREIGN PATENT DOCUMENTS

1160945 4/1991 Japan .

*Primary Examiner*—Christopher A. Fiorilla
*Attorney, Agent, or Firm*—McAulay Fisher Nissen Goldberg & Kiel, LLP

[57] ABSTRACT

A process for preparing calcium silicate articles having a bulk density of 0.3 to 0.9 g/cm$^3$ including the steps of mixing a major portion of calcium silicate and minor portions of anhydrous calcium aluminosilicate or its analogue, a reinforcing fiber and a polymer binder in water to give an aqueous slurry, molding the slurry into a desired for, and drying the molded slurry at 100°–180° C.

4 Claims, No Drawings

PROCESS FOR PREPARING CALCIUM SILICATE ARTICLES

This is a continuation of application Ser. No. 08/217,630, filed Mar. 24, 1994 now abandoned which, in turn, is a continuation of application Ser. No. 08/899,047, filed Jun. 16, 1992, now abandoned, which, in turn, is a continuation of application Ser. No. 07/771,796, filed Oct. 4, 1991, now abandoned, which, in turn, is a continuation of application Ser. No. 07/530,426, filed May 29, 1990, now abandoned, which, in turn, is a continuation of application Ser. No. 07/253,057, filed Oct. 4, 1988, now abandoned, which, in turn, is a continuation-in-part of application Ser. No. 07/145,647, filed Jan. 13, 1988, now abandoned, which, in turn is a continuation of application Ser. No. 07/035,077, filed Apr. 6, 1987, now abandoned

BACKGROUND OF THE INVENTION

1. Field of the invention

The present invention relates to a light weight calcium silicate article having high mechanical strength. More particularly, the invention relates to a light-weight calcium silicate article having high mechanical strength, high heat resistance, and high dimensional stability which can be easily processed like wood.

2. Description of prior art

Calcium silicate-is light-weight and heat-stable material. Therefore, various calcium silicate articles utilizing such favorable properties are sold on market. Examples of such articles include a heat-insulation board utilizing the light weight property and a refractory calcium silicate board utilizing the heat-stable properties. Great amounts of both articles are produced in industry. The heat-insulation board has a bulk density of lower than 0.3 g/cm$^3$, while the refractory board has a bulk density of higher than 0.7 g/cm$^3$. Therefore, a calcium silicate article having a bulk density in the range of 0.3 to 0.7 g/cm$^3$ is hardly available on the market.

The bulk density of 0.3 to 0.7 g/cm$^3$ is almost the same as that of natural wood. Therefore, it has been proposed to produce a synthetic wood using calcium silicate, as stated below:

(1) Japanese Patent Provisional Publication No. 54(1979)-160428 describes a calcium silicate article which is prepared by molding an aqueous mixture of 100 weight parts of calcium silicate hydrate, 10–150 weight parts of hydraulic gypsum, 5–80 weight parts of a polymer emulsion, a flocculant for the polymer emulsion, water and a reinforcing fiber, and then drying the molded mixture;

(2) Japanese Patent Provisional Publication No. 60(1985)-246251 describes a calcium silicate article which is prepared by molding an aqueous mixture of 100 weight parts of calcium silicate hydrate, 5–80 weight parts (as solid content) of carboxyl-containing styrenebutadiene copolymer latex, a cationic polymer flocculant, and water, and then drying the molded mixture;

(3) Japanese Patent Provisional Publication No. 61(1985)-17462 describes a calcium silicate article which is prepared by molding an aqueous mixture of 100 weight parts (as solid content) of calcium silicate hydrate, 5–50 weight parts (as solid content) of a polymer emulsion prepared by polymerization of a hydrophobic ethylenic unsaturated monomer in the absence of an emulsifying agent, and 0.05–15 weight parts of a flocculant, and then drying the molded mixture; and (4) Japanese Patent Application No. 60(1985)-261811 filed in the name of the assignee of the present application describes a calcium silicate comprising 100 weight parts of calcium silicate hydrate, 1–30 weight parts of a reinforcing fiber, 1–40 weight parts of latex, and 0.1–5 weight parts of a dispersant.

The heretofore proposed calcium silicate articles seem to have some drawbacks. Examples of the drawbacks are given below.

The calcium silicate article of (1) above does not have satisfactory mechanical strength. For instance, its specification teaches that bending strength of the article having bulk density. Of 0.5 g/cm$^3$ is approx. 9.8 MPa (approx. 100 kgf/cm$^2$) at the highest. Further, this article does not have satisfactory water resistance, because it contains a great amount of hydraulic gypsum. The incorporation of hydraulic gypsum in such a great amount further brings about other disadvantageous features such as safety, heat resistance, and dimensional B stability. In more detail, a calcium silicate article containing a great amount of gypsum is apt to produce toxic sulfur dioxide by decomposition of gypsum when kept at high temperatures such as 800°–1,000° C., or is apt to shrink in its dimension by releasing the hydrate water when kept at 100°–500° C.

The calcium silicate article of (2) above has an object to solve the problems attached to the calcium silicate article of (1) above such as unsatisfactory water resistance, safety, heat resistance and dimensional stability. However, almost no improvement is seen with respect to mechanical strength of the resulting article. For instance, the working examples given in the specification teach that bending strength of the article having bulk density of 0.5 g/cm$^3$ is a value in the range of 40 to 110 kgf/cm$^2$ (i.e., 3.9 to 10.8 MPa) at the highest. Further, the use of a great amount of such latex as styrene-butadiene copolymer latex (polymer emulsion) is not advantageous from the viewpoint of heat resistance, because the styrene-butadiene copolymer emulsion has high combustion enthalpy and the styrene content sometimes gives black smoke or malodor.

The calcium silicate article of (3) above has an object to solve the problems attached to the calcium silicate articles with respect to water resistance and mechanical strength, and has succeeded in improving the mechanical strength of a calcium silicate article to such extent that bending strength of the article having bulk density of 0.44–0.48 g/cm$^3$ is 12.4–14.7 MPa (130–150 kgf/cm$^3$). However, the resulting article is not satisfactory in heat resistance because a polymer emulsion of a great amount such as 30 weight parts (as solid content) is incorporated into the article.

The calcium silicate article of (4) above has an object to solve the problems attached to the calcium silicate articles of (1) and (2) above and has succeeded in improving the mechanical strength of a calcium silicate article to such extent that bending strength of the article having bulk density of 0.5 g/cm$^3$ is approx. 11.8 MPa (approx. 120 kgf/cm$^3$). However, the mechanical strength is preferably improved furthermore.

SUMMARY OF THE INVENTION

The present invention has an object to provide an improved light weight calcium silicate article having satisfactory properties such as high heat resistance and high mechanical strength.

The invention has another object to provide an improved calcium silicate article which is of value as a heat resistant building material.

The invention has a further object to provide an improved calcium silicate article which is utilizable as a synthetic wood.

The invention has a still further object to provide an improved calcium silicate article which has a bulk density of 0.3 to 0.9 g/cm$^3$ and shows high mechanical strength.

The invention has a still further object to provide an improved calcium silicate article which is utilizable as a building material which hardly releases $SO_2$ when heated to high temperatures.

There is provided by the present invention a light weight calcium silicate article which comprises 100 weight parts of calcium silicate, ettringite which has the formula of $3CaO.Al_2O_3.3CaSO_4.nH_2O$ ("n" is 31 or 32) and has been prepared by a reaction of 1–15 weight parts of an ettringite-forming material with water, 1–30 weight parts of a reinforcing fiber and 1–40 weight parts of a polymer binder.

The light weight calsium silicate article of the invention can be prepared by molding sun aqueous mixture of 100 weight parts of calcium silicate, 1–19 weight parts of a material capable of forming ettringite upon reaction with water, 1–30 weight parts of a reinforcing fiber and 1–40 weight parts of a polymer binder in water into a desired form, and drying the molded mixture.

The addition of the ettringite forming material into the aqueous mixture before the stages for molding and drying serves to enhance the mechanical strength of the resulting article.

DETAILED DESCRIPTION OF THE INVENTION

Preferred examples of calcium silicate to be used in the preparation of the article of the invention include tobermorite and xonotlite which can be produced from lime material, siliceous material and water through hydrothermal crystallization process. In the preparation of the calcium silicate article, calcium silicate can be used in the form of a calcium silicate slurry, more particularly an aqueous calcium silicate hydrate slurry. Examples of the lime materials include quick lime or slaked lime. Examples of the siliceous material include siliceous stone, siliceous sand, and ferro-silicon dust. These materials can be employed in the form of fine powder.

In the production of calcium silicate, the lime material, the siliceous material and water are mixed at a predetermined ratio and converted into an aqueous calcium silicate hydrate slurry (hereinafter referred to as simply "calcium silicate slurry") generally by hydrothermal crystallization process in an autoclave. The ratio between the lime material and the siliceous material varies with nature of the desired calcium silicate, nature of the starting materials, etc. For instance, xonotlite ($6CaO.6SiO_2.H_2O$) can be produced from a mixture of the lime material and siliceous material containing CaO and $SiO_2$ in molar ratio of 1/1. Water can be employed in an amount of 5 to 15 times as much as the total weight of the lime material and siliceous material. The mixture of the lime material, siliceous material and water in the predetermined ratio is then placed in an autoclave and subjected to hydrothermal crystallization reaction at 150°–250° C. for 1–24 hours in the autoclave. The reaction is carried out under continuous or intermittent stirring. Thus, a calcium silicate slurry is obtained.

The calcium silicate slurry is then mixed with a reinforcing fiber, a polymer, and a material capable of producing. ettringite upon reaction with water.

Examples of the reinforcing fibers include fibers of inorganic materials such as glass fiber and carbon fiber and fibers of organic polymers such as fibers of nylon (i.e., polyamide), polypropylene, rayon, and vinylon (i.e., polyvinyl alcohol). The reinforcing fiber can be employed singly or in combination of two or more different fibers. The reinforcing fiber serves for increasing mechanical strength and elasticity of the resulting article, and further for improving compatibility of calcium silicate and the polymer in the slurry in the course of the production to facilitate a procedure of filtration and separation under pressure for dehydrating and molding to form a shaped product. From viewpoints of easiness of processing, water resistance, heat resistance, the reinforcing fiber is employed in an amount of, generally 1 to 30 weight parts, preferably 2 to 15 weight parts, more preferably 3 to 10 weight parts, per 100 weight parts of calcium silicate.

The polymer serving as a binder is generally introduced in the form of a polymer emulsion. Examples of the polymer employable in the invention include synthetic B polymers such as ethylene-vinyl acetate, styrenebutadiene copylymer, acrylonitrile- butadiene copolymer, butadiene (homo)polymer, methyl methacrylate-butadiene copolymer, homopolymer and copolymer of isoprene, and ethylene-propylene. The polymer serves to firmly combine adjacent calcium silicate units to each other and/or firmly combine the reinforcing fibers with calcium silicate. By the use of a polymer in the preparation of a calcium silicate article, the resulting article produces less amount of dust when it is cut, and further firmly fixes nails introduced therein. The binder polymer is used in an amount of generally 1 to 40 weight parts, preferably 3 to 20 weight parts, per 100 weight parts of calcium silicate. If the amount of polymer is too small, the resulting article is apt to show poor workability of processing as well as poor mechanical strength. If the amount of the polyer is too large, the resulting article shows poor heat resistance.

The ethylene-vinyl acetate is preferably used in combination of a water-retentive agent.

Examples of the water-retentive agent include water-soluble cellulose derivatives such as methyl cellulose and carboxymethyl cellulose, and water-absorbing polymers such as polyvinyl alcohol, poly(sodium acrylate) and polyethylene oxide. The use of the water-retentive agent SO in combination with a polymer such as ethylene-vinyl acetate in the form of an emulsion is effective to delay water evaporation on the portion of the emulsion when the molded product is dried. Therefore, the polymer film is less damaged at the drying stage, so that a calcium silicate article improved in mechanical strength and water resistance is obtained. The water-retentive agent can be employed generally in an amount of 0.01–20 weight parts, preferably 0.2–20 weight parts, per 100 weight parts of the binder polymer such as ethylene-vinyl acetate.

In the case of using ethylene-vinyl acetate as the binder, the resulting article difficultly releases dusts when it is cut. Further, the resulting article shows particularly high fixation for nails or other materials introduced therein.

In combination with the binder polymer, one or more of additives for improving properties of the binder polymer, for instance, a sulfur type vulcanizing agent, a non-sulfur type vulcanizing agent, and a fusion accelerating agent can be employed. The physical properties of the resulting article such as surface hardness, elasticity, fixation of nails, are improved by the inclusion of such additives.

Various kinds of materials capable of producing ettringite upon reaction with water can be employed in the present invention. Examples include the following:

(1) an expansive cement selected from the group consisting of an expansive cement containing anhydrous calcium aluminosulfate ($4CaO.3Al_2O_3.SO_3O$) which is named K-type, an expansive cement containing calcium aluminate cement and calcium sulfate which is named M-type and an expansive cement containing tricalcium aluminate and calcium sulfate which is named S-type. The names of K-type, M-type and S-type are defined in ACI (American Cement Institute) Classification and also in ASTM C-845;

(2) calcium sulfoaluminate clinker, a mixture of calcium sulfoaluminate clinker and gypsum, or a mixture of aluminate clinker and gypsum;

(3) a mixture of a) blast furnace slag or aluminum hydroxide-containing material, b) gypsum, and c) quick lime or slaked lime; and (4) a mixture of alumina cement and gypsum.

The above material can form upon reaction with water needle ettringite crystal ($3CaO.Al_2O_3.3CaSO_4.nH_2O$ wherein "n" is 31 or 32) in the course of the preparation of the calcium silicate. In more detail the formation of the ettringen crystals takes place, at a stage for mixing a calcium silicate slurry, a reinforcing fiber, a binder polymer, etc., a stage for filtration and dehydration to form a molded product, and/or a stage for drying the molded product. The formed ettringite crystals serve to increase the strength of the resulting calcium silicate article through entanglement of the needle crystals with each other and expansion of the crystals. Further, the formation of ettringite serves to decrease shrinkage of the article at a drying stage, so that the resulting article is less liable to break in the drying stage and thus productivity (yield) increases. The material capable of forming ettringite by reaction with water is employed in an amount of 1 to 30 weight parts per 100 weight parts of calcium silicate. If an excessively great amount of such material is introduced, the resulting article shows poor workability of processing, as well as low mechanical strength.

Portland cement also contains the effective ingredient of the aluminate clinker, that is, calcium aluminate ($3CaO.Al_2O_3$). Accordingly, portland cement forms ettringite in the presence of gypsum. However, portland cement also produces free $Ca(OH)_2$ through hydration reaction of other ingredients thereof, such as $3CaO.SiO_2$ and $2CaO.SiO_2$, so that the resulting article disadvantageously shows high pH. Further, since portland cement contains only a small amount of calcium aluminate, effect given by formation of ettringite is not high, even if a large amount of portland cement is incorporated. Accordingly, from the viewpoint of improvement of mechanical strength of the resulting article, the addition of portland cement is not advantageous.

In addition of the above-mentioned materials, other additives such as a dispersing agent and a filtration aid can be incorporated into the calcium silicate mixture for the preparation of the calcium silicate article.

The procedure for mixing the starting materials, such as a calcium silicate slurry, a reinforcing fiber, a binder polymer, a material capable of forming ettringite upon reaction with water, etc. can be performed using conventional mixing means such as a kneader. Any mixing apparatus can be employed, so long as the apparatus can give a slurry wherein the introduced materials are homogeneously dispersed. The homogeneously dispersed slurry is then formed (i.e., molded) to have a desired shape For performing the molding procedure, the slurry can be introduced into a mold and dehydrated under pressure. Any known process can be utilized according to the purpose and the utilization of the desired article.

The molded product is dried to give the desired calcium silicate article. There is no specfic limitation with respect to the temperature for drying the molded product. A temperature in the range of generally 100° to 180° C., preferably 120° to 160° C. is adopted. In the case of using ethylene-vinyl acetate copolymer in combination with a water-retentive agent as the binder, the temperature for drying is generally in the range of 60° to 160° C., preferably in the range of 80° to 140° C.

The present invention is further described by the following examples. In the examples, the evaluation of the obtained calcium silicate article was carried out in accordance with the following tests:

(1) Bending Strength: in accordance with JIS (Japanese Industrial Standard) A 1408;

(2) Workability in Processing: judged by conducting ordinary processing applied to wood, namely, planing woods, hammering nails into woods, and sawing woods;

(3) Shrinkage in Drying Stage: determined by measuring thickness of the article molded under pressure and thickness of dried article; and (4) Incombustibility Test: defined by Official Notice of Ministry of Construction of Japan.

The incombustiblity test is summerized as follows. In the test, a test piece is placed in a heating furnace kept at 740°–760° C. for 20 min., and elevation of the temperature (which is caused by combustion of the test piece) inside of the furnace from the time of introduction of the test piece and the time after lapse of 20 min. is measured. So long as the temperature elevation is not larger than 50° C., the tested material is accepted as incombustible material.

EXAMPLE 1

Silica powder and slaked lime were mixed to have molar ratio of 1:1 ($SiO_2:CaO$). To the resulting mixture was added water in an amount of 10 times as much as the total weight of $SiO_2$ and CaO. In an autoclave, the mixture was heated under stirring to 210° C. for 5 hours under pressure of 1.86 MPa (19 kgf/cm$^2$) for performing hydrothermal crystallization reaction. The resulting calcium silicate hydrate slurry was mixed with 5 weight parts (as solid content) of styrene-butadiene latex (styrene-butadiene copolymer-containing emulsion), 3 weight parts of an oxycarboxylate type dispersing agent and 2.5 weight parts of an anhydrous calcium aluminosulfate ($3CaO.3Al_2O_3.CaSO_4$: expansive cement), per 100 weight parts of solid content of the calcium silicate hydrate slurry. The mixture was further mixed with 7 weight parts of glass fiber.

The resulting composition slurry was placed in a mold (30 cm×30 cm) and dehydrated under a pressure of 2.94 MPa (30 kgf/cm$^2$). The dehydrated product was dried at 120° C. for 16 hours to give a calcium silicate article.

The results of the evaluation on the article are set forth in Table 1.

EXAMPLES 2 & 3

The procedures of Example 1 were repeated except that the expansive material was employed in amounts of 5.0 weight parts and 10.0 weight parts, to produce calcium silicate articles of Examples 2 and 3, respectively.

The results of the evaluation on the articles are set forth in Table 1.

Comparison Example 1

The procedures of Example 1 were repeated except that no expansive material was employed, to produce a calcium silicate article.

The results of the evaluation on the article are set forth in Table 1.

Comparison Example 2

The procedures of Example 1 were repeated except that the expansive material was employed in an amount of 20.0 weight parts, to produce a calcium silicate article.

The results of the evaluation on the article are set forth in Table 1.

Comparison Example 3

The procedures of Example 1 were repeated except that the expansive material was replaced with normal portland cement in an amount of 2.5 weight parts, to produce a calcium silicate article.

The results of the evaluation on the article are set forth in Table 1.

Comparison Example 4

The procedures of Example 1 were repeated except that the expansive material was replaced with alumina cement in an amount of 2.5 weight parts, to produce a calcium silicate article.

The results of the evaluation on the article are set forth in Table 1.

Comparison Example 5

The procedures of Example I were repeated except that the expansive material was replaced with α-hemihydrated gypsum in an amount of 2.5 weight parts, to produce a calcium silicate article.

The re#ults of the evaluation on the article are set forth in Table 1.

TABLE 1

| | Bulk Density ($g/cm^3$) | Bending Strength (MPa) | Shrinkage upon Dryness (%) | Workability of Processing |
|---|---|---|---|---|
| Example | | | | |
| 1 | 0.49 | 14.8 | 4.5 | AA |
| 2 | 0.49 | 15.7 | 4.3 | AA |
| 3 | 0.51 | 15.6 | 4.1 | AA |
| Com. Example | | | | |
| 1 | 0.50 | 12.3 | 11.3 | AA |
| 2 | 0.50 | 12.7 | 4.0 | BB |
| 3 | 0.48 | 9.5 | 8.6 | BB |
| 4 | 0.51 | 9.0 | 9.8 | BB |
| 5 | 0.50 | 9.8 | 10.8 | AA |

Remarks:
AA means "excellent"
BB means "practically acceptable"

EXAMPLE 4

The procedures of Example 1 were repeated except that the expansive material was replaced with a crushed mixture (Blaine specific surface: 5,000 $cm^2/g$) of aluminate clinker containing 20% of $3CaO.Al_2O_3$ (having the composition given below) and gypsum dihydrate (having been mixed to have $SO_3/Al_2O_3=3$) in an amount of 2.5 weight parts, to produce a calcium silicate article.

Composition of aluminate clinker (wt.%): ig. loss 0.2%, insol 0 1%, $SiO_2$ 21.3%, $Al_2O_3$ 8.4%, $Fe_2O_3$ 1.3%, CaO 67.1%, MgO 0.4%, $SO_3$ 0.3%, Total 99.1%.

The results of the evaluation on the article are set forth in Table 2.

Comparison Example 6

The procedures of Example 1 were repeated except that the expansive material was replaced with the same crushed aluminate clinker containing 20% of $3CaO.Al_2O_3$ (Blaine specific surface: 5,000 $cm^2/g$) as in Example 4 in an amount of 2.5 weight parts, to produce a calcium silicate article.

The results of the evaluation on the article are set forth in Table 2.

TABLE 2

| | Bulk Density ($g/cm^3$) | Bending Strength (MPa) | Shrinkage upon Dryness (%) | Workability of Processing |
|---|---|---|---|---|
| Example 4 | 0.50 | 15.2 | 6.7 | AA |
| Com. Example 6 | 0.49 | 9.3 | 8.0 | AA |

Remark: AA means "excellent"

EXAMPLES 5 & 6

The procedures of Example 1 were repeated except that the expansive material was replaced with a crushed calcium sulfoaluminate clinkers having the compositions indicated below (Blaine specific surface: 5,000 $cm^2/g$) in amounts of 2.5 weight parts, to produce calcium silicate articles of Examples 5 and 6.

Composition of calcium sulfoaluminate clinker for Example 5 (wt %): ig. loss 0 3%, insol. 0 1%, $SiO_2$ 5.2%, $Al_2O_3$ 47.1%, $Fe_2O_3$ 0.1%, CaO 35.8%, MgO 0.1%, $SO_3$ 10.8%, Total 99.5%.

Composition of calcium sulfoaluminate clinker for Example 6 (wt %): ig loss 0 4%, insol. 0 1% $SiO_2$ 23.9%, $Al_2O_3$ 14.8%, $Fe_2O_3$ 0.4%, CaO 50.8%, MgO 0.1%, $SO_3$ 9.3%, Total 99.8%. The results of the evaluation on the article are set forth in Table 3.

TABLE 3

| | Bulk Density ($g/cm^3$) | Bending Strength (MPa) | Shrinkage upon Dryness (%) | Workability of Processing |
|---|---|---|---|---|
| Example | | | | |
| 5 | 0.52 | 17.6 | 4.0 | AA |
| 6 | 0.50 | 16.5 | 5.0 | AA |

Remark: AA means "excellent"

EXAMPLE 7

The procedures of Example 1 were repeated except that the expanding agent was replaced with a combination of 2 weight parts of a blast furnace slag, 1 weight part of gypsum dihydrate and 0.5 weight part of slated lime to produce a calcium silicate article.

The results of the evaluation on the article are set forth in Table 4.

TABLE 4

|  | Bulk Density (g/cm³) | Bending Strength (MPa) | Shrinkage upon Dryness (%) | Workability of Processing |
|---|---|---|---|---|
| Example 7 | 0.48 | 14.5 | 6.7 | AA |

Remark: AA means "excellent"

We claim:

1. A process for preparing calcium silicate articles having a bulk density of 0.3 to 0.9 g/cm³ which comprises the steps of:

mixing 100 weights parts of calcium silicate, 1–15 weight parts of a material selected from the group consisting of anhydrous calcium aluminosulfate, a mixture of calcium aluminate and calcium sulfate, and a mixture of tricalcium aluminate and calcium sulfate, 1–30 weight parts of a reinforcing fiber, and 1–40 weight parts of a polymer binder in water to give an aqueous slurry;

molding the aqueous slurry into a desired form; and drying the thus molded slurry at a temperature of 100° to 180° C.

2. The process of claim 1 wherein the molded slurry is dried at a temperature of 120° to 160° C.

3. The process of claim 1, wherein the molded slurry is pressed in advance of the drying.

4. The process of claim 1, wherein the reinforcing fiber is glass fiber.

\* \* \* \* \*